(12) United States Patent
Niering et al.

(10) Patent No.: US 11,315,188 B2
(45) Date of Patent: Apr. 26, 2022

(54) ADAPTIVE COUPLING-SYSTEM BASED ON A FLEXIBLE RISK TRANSFER STRUCTURE AND CORRESPONDING METHOD THEREOF

(71) Applicant: Swiss Reinsurance Company Ltd., Zurich (CH)

(72) Inventors: Rita Niering, Attenkirchen (DE); Andreas Michael Schmid, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 0 days.

(21) Appl. No.: 15/279,011

(22) Filed: Sep. 28, 2016

(65) Prior Publication Data

US 2017/0083981 A1 Mar. 23, 2017

Related U.S. Application Data

(63) Continuation of application No. PCT/EP2014/056314, filed on Mar. 28, 2014.

(51) Int. Cl.
*G06Q 40/08* (2012.01)
*G06Q 10/06* (2012.01)
*G06Q 20/10* (2012.01)

(52) U.S. Cl.
CPC ......... *G06Q 40/08* (2013.01); *G06Q 10/0635* (2013.01); *G06Q 20/102* (2013.01)

(58) Field of Classification Search
None
See application file for complete search history.

(56) References Cited

U.S. PATENT DOCUMENTS

| | | | | |
|---|---|---|---|---|
| 7,398,218 B1* | 7/2008 | Bernaski | ................ | G06Q 50/24 705/3 |
| 7,860,734 B2* | 12/2010 | Solanki | .................. | G06Q 40/08 705/4 |
| 8,452,620 B1* | 5/2013 | Grundfest | .............. | G06Q 40/08 705/28 |
| 2001/0027437 A1* | 10/2001 | Turbeville | ............. | G06Q 20/10 705/38 |

(Continued)

OTHER PUBLICATIONS

An Exposure Rating Approach to Pricing Property Excess-of-Loss Reinsurance by Stephen J. Ludwig. (1991), PCAS vol. LXXVIII. URL: http://citeseerx.ist.psu.edu/viewdoc/versions?doi=10.1.1.555.1250 (Year: 1991).*

(Continued)

*Primary Examiner* — Narayanswamy Subramanian
*Assistant Examiner* — Ayal I. Sharon
(74) *Attorney, Agent, or Firm* — Oblon, McClelland, Maier & Neustadt, L.L.P.

(57) ABSTRACT

A system and a method, the method including assigning a payment parameter to each variable risk transfer segment of a top-down table and accumulating payment parameters to a total payment sum, capturing payment transfer parameters from a first payment-transfer device to a second payment-transfer device, and when the total payment sum at the second payment-transfer device has been triggered, transferring the risk exposure of a first insurance system associated with the variable risk transfer segments of the top-down table to a second insurance system.

23 Claims, 6 Drawing Sheets

(56) References Cited

U.S. PATENT DOCUMENTS

| | | | | |
|---|---|---|---|---|
| 2003/0139948 | A1* | 7/2003 | Strech | G06Q 40/00 705/4 |
| 2004/0236698 | A1* | 11/2004 | Sweeney | G06Q 20/382 705/64 |
| 2005/0075910 | A1* | 4/2005 | Solanki | G06Q 40/08 705/4 |
| 2006/0218019 | A1* | 9/2006 | Reis | G06Q 40/08 705/4 |
| 2006/0242052 | A1* | 10/2006 | Long | G06Q 40/08 705/35 |
| 2007/0282641 | A1* | 12/2007 | Thomas | G06Q 40/08 705/4 |
| 2008/0027841 | A1* | 1/2008 | Eder | G06Q 40/00 705/35 |
| 2008/0065425 | A1* | 3/2008 | Giuffre | G06Q 10/0635 705/4 |
| 2009/0043637 | A1* | 2/2009 | Eder | G06Q 10/067 705/35 |
| 2009/0100095 | A1* | 4/2009 | Jung | G06Q 10/0635 |
| 2009/0248454 | A1* | 10/2009 | Amigo | G06Q 40/02 705/4 |
| 2010/0332373 | A1* | 12/2010 | Crabtree | G06Q 40/04 705/37 |
| 2014/0039936 | A1* | 2/2014 | Da Victoria Lobo | G06Q 40/08 705/4 |
| 2015/0112734 | A1* | 4/2015 | Knaust | G06Q 50/22 705/4 |
| 2015/0112735 | A1* | 4/2015 | Knaust | G06Q 40/08 705/4 |
| 2015/0170311 | A1* | 6/2015 | Dlugosch | G08G 5/0034 705/7.12 |
| 2015/0187018 | A1* | 7/2015 | Knaust | G06Q 10/10 705/4 |
| 2017/0004581 | A1* | 1/2017 | Trohler | G06Q 10/0635 |
| 2018/0181144 | A1* | 6/2018 | Steinmann | G06Q 30/0283 |
| 2018/0189889 | A1* | 7/2018 | Ungricht | G06Q 40/08 |
| 2018/0276759 | A1* | 9/2018 | Schoen | G06Q 40/08 |

OTHER PUBLICATIONS

"Basics of Reinsurance Pricing: Actuarial Study Note" by David R. Clark. First Version 1996. Revised 2014. URL: www.casact.org/library/studynotes/Clark_2014.pdf (Year: 2014).*

"Basics of Reinsurance Pricing" by David R. Clark. (Jul. 1996). URL: https://www.casact.org/library/studynotes/clark6.pdf (Year: 1996).*

"Insurer Demand for Catastrophe Reinsurance" by Anne Gron. In "The Financing of Catastrophe Risk", Editor: Kenneth A. Froot. Publisher: University of Chicago Press. ISBN: 0-226-26623-0. Publication Date: Jan. 1999. URL: http://www.nber.org/chapters/c7947 (Year: 1999).*

"Risk Models for Capital Adequacy: Applications in the Context of Solvency II and Beyond" by Peter Liebwein. The Geneva Papers, (2006), Issue 31, pp. 528-550. URL: https://www.jstor.org/stable/41952899 (Year: 2006).*

"Managing Unknown Risks: The Future of Global Reinsurance" by Graciela Chichilnisky and Geoffrey Heal. (Aug. 1997). PaineWebber Working Paper Series in Money, Economics and Finance. URL: http://citeseerx.ist.psu.edu/viewdoc/summary?doi=10.1.1.197.7871 (Year: 1997).*

Wikipedia "Hash Table". Last edited Mar. 26, 2014. https://en.wikipedia.org/w/index.php?title=Hash_table&oldid=601425765 (Year: 2014).*

Dynamic programming and memoization: bottom-up vs top-down approaches. Printed on Jan. 23. 2019. Initiated on May 28, 2011. https://stackoverflow.com/questions/6164629/dynamic-programming-and-memoization-bottom-up-vs-top-down-approaches (Year: 2019).*

Table-Driven Top-Down Parsers. Fall 2012. pages.cs.wisc.edu/~��scher/cs536.f12/lectures/Lecture23.pdf (Year: 2012).*

John D. Pollner. "Catastrophe Risk Management: Using Alternative Risk Financing and Insurance Pooling Mechanisms" Policy Research Working Paper 2560. The World Bank. Feb. 2001. https://www.gfdrr.org/ (Year: 2001).*

Gunther Kraut. "A Fair Pool Sharing Mechanism for Illiquid Catastrophe Risk Markets" Munich Risk and Insurance Center. Working Paper 19. Dec. 31, 2014. www.mric.lmu.de/research/wp (Year: 2014).*

Haslip, G. G. and Kaishev, V. K. (2010). Pricing of reinsurance contracts in the presence of catastrophe bonds. ASTIN Bulletin, 40(1), pp. 307-329. doi: 10.2143/AST.40.1.2049231 (Year: 2010).*

International Search Report dated Oct. 1, 2014 in PCT/EP2014/056314.

International Preliminary Report on Patentability and Written Opinion dated Oct. 1, 2014 in PCT/EP2014/056314.

* cited by examiner

ADAPTIVE COUPLING-SYSTEM BASED ON A FLEXIBLE RISK TRANSFER STRUCTURE AND CORRESPONDING METHOD THEREOF

CROSS REFERENCE TO RELATED APPLICATION

This application is a continuation of PCT International Application No. PCT/EP2014/056314, filed on Mar. 28, 2014, the entire contents of which are incorporated herein by reference.

FIELD OF THE INVENTION

The present invention relates to automated insurance systems, in particular coupling-systems for automated insurance systems, that offer risk sharing for a variable number of risk exposure components by providing dynamic self-sufficient risk protection for the risk exposure components by means of two complementary coupled insurance systems; e.g., an insurance system and a reinsurance system. In particular, the invention relates to an event-driven switching device for the complementary switching of two coupled, autonomously operated resource-pooling systems on the basis of a flexible and adaptable risk transfer structure and function in order to provide risk protection with regard to the pooled risk exposure components by means of the two complementary, activated resource-pooling systems associated with the insurance systems.

BACKGROUND OF THE INVENTION

Risk transfer has been used for a long time in the state of the art as a technical tool to manage the risk of uncertain losses, in particular to keep up operation of functional, technical or business units. These days, significant risk exposure is associated with many aspects in the life and non-life sectors. Risk exposed units, such as any kinds of objects, individuals, corporate bodies and/or legal entities, are necessarily confronted with many forms of active and passive risk management to hedge and protect against the risk of certain losses and events. The prior art addresses such risk of loss, for example, based on transferring and pooling the risk of loss from a plurality of risk exposed entities to a dedicated pooling entity. In essence, this can be executed by effectively allocating the risk of loss to this pooling unit or entity in that resources of associated units, which are exposed to a certain risk, are pooled. If one of the units is hit by an event that is linked to a transferred risk, the pooling entity directly intercepts the loss or damage caused by the event by transferring resources from the pooled resources to the affected unit. Pooling of resources can be achieved by exchanging predefined amounts of resources with the resource-pooling system; e.g., payments or premiums that are to be paid for the transfer of the risk. This means that predefined resource amounts are exchanged for the other unit thereby assuming the risk of loss.

As described above, insurance systems use resource-pooling systems to pool the resources and risks of associated risk exposed components. However, to avoid operational instabilities, often such resource pooling systems of on insurance system are coupled to one or more other resource pooling systems in order to redistribute parts of their pooled risks. Correspondingly, a loss that is to be covered can be segmented by those coupled insurance systems, wherein for switching from one insurance system to another insurance system, an optimal risk transfer structure has to be provided by the systems. The issue of providing optimal reinsurance solutions is a classical problem of insurance systems, since the appropriate use of coupled secondary resource pooling systems, as, e.g., reinsurance systems, is often an effective risk management tool for managing and mitigating the risk exposure of a primary system and for guaranteeing operational stability and operational best mode practices for a minimal pooling of necessary resources. However, the related effectiveness depends on the choice of the most optimized risk transfer structure. Typically, the technical problem of optimally coupling insurance systems can be defined as an issue of optimization; meaning the goal is minimizing the total risk exposure of an insurance system under different boundary criteria, such as, e.g., criteria of value at risk or conditional value at risk, i.e. by finding the optimal balance between the benefit (reducing the risk by purchasing reinsurance shares) and the cost (premiums) of the redistributed insurance risk shares. Therefore, the object of the present invention addresses the technical problem of coupling two resource pooling systems with the goal of pooling the risk exposure of associated components and in seeking better and more effective technical implementations on the basis of an appropriate risk transfer structure.

The prior art specifies a plurality of systems addressing the above-mentioned problem. For example, US 2004/0236698 A1 describes a system for automated risk management trade between two coupled systems: in particular, a insurance and a reinsurance system. This system provides for the transfer of premiums and loss payments directly between the risk-pooling systems. Further, the system allows for interactions between the two coupled systems, which allows for decision-making functions concerning reinsurance products. However, US 2004/0236698 A1 does not describe how a loss transfer structure should be designed for a specific insurance system, or how the insurance system should optimize its own risk exposure for the process of determining the mitigation of its own risk. Another example of the known prior art in the field of automated risk transfer systems is US 2011/0112870 A1. US 2011/0112870 A1 discloses a system for determining a percentage for assigning, i.e., transfer-related risk in an insurance pool, wherein the transferred risks are shared via a secondary resource pooling system that is based on predefined transfer-specific conditions of a reinsurance contract. The system mainly allows for automatically providing information as to losses, which is transferred to the captive resource pooling system in insurer's system and reinsurer's system. However, US 2011/0112870 A1 does not disclose a general method for determining the amount of the actual risk transfer. Still another example of a prior art patent in the field of optimal risk transfer strategies is U.S. Pat. No. 7,970,682 B1. U.S. Pat. No. 7,970,682 B1 discloses a system that automatically provides a primary resource pooling system's risk transfer structure for the purpose of accommodating the long-standing exposure of liabilities, for achieving significant risk transfer to a third party (reinsurer), for reducing potential financial reporting inconsistencies between hedge assets and liabilities, for less operational risk, and finally for having less exposure to rollover risk (due to changes in the cost of hedging instruments); i.e., in effect, tools for assuring the operational stability of the primary resource pooling system. U.S. Pat. No. 7,970,682 B1 is not specifically directed at optimizing the risk transfer structures of the pooled risk of a primary resource and risk pooling system; instead, U.S. Pat. No. 7,970,682 B1 is another example for an optimization of the primary insurance system's risk strategies. However, nothing in the prior art provides a system for flexible risk transfer modeling by a segmentation of the risk transfer function in several layers using different shares, which allows for individual optimization between the pooled resources of the secondary resource pooling system (premium) and the appropriate benefit level for operational stability of the primary resource pooling system.

In summary, in the prior art, existing systems, which operation are at least partially based on risk transfer schemes or structures come in many different forms, wherein they often have very different objectives and operational approaches. However, typically, the range of schemes or structures of the prior art systems are specific to one particular locality, sector or country, supporting the view that there is no 'one-size-fits-all' solution in the prior art. Furthermore, the optimization of the prior art systems is restricted to their structure, upon which they are based on, i.e. either by a proportional or nor-proportional approach. Therefore, the optimizations of the prior art systems are technically bound to their chosen risk transfer structure, as proportional or non-proportional. So, the prior art systems do technically not allow a flexible, completely problem-specific adapted optimization by means of determining an appropriately adapted risk transfer function, moreover not by a dynamically or semi-dynamically self-adapted risk transfer structure by means of the systems. Starting form the prior art systems, constructing and assessing the effectiveness and sustainability of a risk transfer structure, particularly in the context of adaptation of complementary coupled systems, is a technical challenge. This goes beyond pure economic cost-benefit analysis, and it needs to include the recognition of the different optimization objectives such as vulnerability reduction, commercial viability, affordability, and the financial sustainability of a scheme in the context of changing risk levels due to optimizing risk transfer structures, but is a technical challenge on the construction an technical basis of such systems, themselves.

SUMMARY OF THE INVENTION

It is one object of the present invention to provide a system and method for sharing the risk of risk events of a variable number of risk exposure components by providing dynamic, self-sufficient risk protection for the risk exposure components; this is achieved by means of a primary resource-pooling system, which is stabilized and optimized by an appropriate partial risk transfer to at least one secondary resource and risk pooling system using an optimized risk transfer structure. In particular, the system provides an automated switching mechanism between the two coupled systems and offers a measure for the optimization of the systems. A further object of the invention seeks to provide a way to technically capture, handle and automate complex, related risk transfer structures and switching operations of the insurance industry that are related to optimally shared risks and transfer operations. Another object of the invention seeks to synchronize and adjust such operations based on technical means. In contrast to standard practice, the resource-pooling systems creates a reproducible operation with the desired, technically based, repetitious accuracy that relies on technical means, process flow and process control/operation.

According to the present invention, these objects are achieved, particularly, with the features of the independent claims. In addition, further advantageous embodiments can be derived from the dependent claims and the related descriptions.

According to the present invention, the above-mentioned objects for complementary switching of two coupled, autonomously operated insurance systems that are provided for the purpose of self-sufficient risk protection of a variable number of risk exposure components are achieved, particularly, in that a system is envisioned that includes an event-triggered switching device; and said switching device operates with two coupled, automated resource-pooling systems that are associated with the insurance systems, and wherein the risk exposure components are connected to the resource-pooling system of the first insurance system by means of a plurality of first payment-transfer modules configured to receive and store payments from the risk exposure components for pooling their risks, and wherein the first resource-pooling system is connected to the second resource-pooling system of the second insurance system by means of a second payment-transfer module configured to receive and store payments from the resource-pooling system of the first insurance system for transferring segmentation layers of the pooled risks of the risk exposure components from the first insurance system to the second insurance system; and in that the switching device comprises a top-down table providing data structures for storing a plurality of variable risk transfer segments that comprise an assigned segment value, and wherein an adaptable risk transfer function is provided by the structure of the plurality of variable risk transfer segments by means of an assembly module; and in that by means of a core engine of the switching device a payment parameter is assigned to each variable risk transfer segment of the top-down table and accumulated to form a total payment sum, and wherein the switching device comprises a capturing device for capturing payment transfer parameters from the first payment-transfer module to the second payment-transfer module, and wherein, upon triggering a transfer of the total payment sum at the second payment-transfer module, the risk exposure of the first insurance system associated with the variable risk transfer segments is transferred to the second insurance system; in that the core engine comprises event-driven triggers that trigger in a data flow pathway of measuring devices, which are associated with the risk exposure components, a signal for the occurrence of a risk event, and wherein, in case of a triggering of an occurrence of a risk event in the data flow pathway, the corresponding variable risk segment is determined within the top-down table by means of the core engine, particularly based on the measured actual loss; and in that, in case of the occurrence of a risk event, an activation signal is generated by means of the switching device based on the determined variable risk segment and the measured actual loss, and wherein the switching device triggers the complementary activation of the first and second resource pooling system by means of the generated activation signal by transferring the activation to the first and/or second resource pooling system to provide risk protection for the risk exposure components. The data structure of the top-down table for storing the variable risk transfer segments can at least, for example, comprise, for each of the stored risk segments, parameters that indicate the size of the variable risk transfer segments and the payment parameters that are assigned to each variable risk transfer segment of the top-down table. Further, the data structure can, e.g., comprise a parameter indicating the accumulated total payment sum that is required by the second resource pooling system from the first resource pooling system for transferring the risk corresponding to the defined risk transfer structure by means of the variable risk transfer segments. A loss that is associated with the risk event and allocated with a pooled risk exposure component can be, e.g., distinctly covered by the first resource pooling system of the first insurance system, such as by means of a transfer of payments from the first resource pooling system to said risk exposure component, and wherein a second transfer of payment from the second resource pooling system to the first resource pooling system is triggered by means of the generated activation signal based on the determined variable risk segment within the top-down table and the measured actual loss of the risk exposure component or the adaptable risk transfer function provided by the assembly module. However, as an embodied variant, it is also possible that the loss, which corresponds to the risk transferred to the second resource pooling system as defined by the corresponding risk segments, is directly covered by the second resource pooling system in that resources are transferred from the second resource pooling system to the concerned risk exposure components. The invention has, inter alia, the advantage that the system provides the technical means for optimizing the coupling and switching of coupled resource pooling systems, thereby providing an effective risk protection of risk exposed components. The inventive system further allows for a more flexible risk transfer structure: this is achieved by a segmentation of the risk transfer function into several layers with different shares, instead of using a purely proportional or non-proportional risk transfer structure. Moreover, the risk structure is easily adaptable by the first and/or second resource pooling system to the technical or otherwise individual conditions and requirements thereof. The segmentation allows an optimized adjustment of the risk transfer structure to a specific requirements of the insurance system; i.e., the primary insurance system's risk exposure. Due to the better adjustment of risk transfer structure and/or function, the provided solution can offer the advantages of proportional and non-proportional risk transfer. The need for optimized insurance system coupling and switching is a typical technical problem in the field of insurance technology; and the appropriate use of a risk transfer coupling structure is a necessary requirement for an effective and optimized risk management tool for the purpose of managing and mitigating the primary resource pooling's risk exposure. However, effectiveness depends on the choice of the most optimized risk transfer structure, which is implemented in the context of the switching functionality of the two coupled systems. The invention provides supremely optimized coupling based on the classically prevalent interest of managing the two coupled risk transfer systems, seeking better and more effective operation and strategies based on an appropriate risk transfer structure. The system has, furthermore, the advantage that smaller pooled resources, in contrast to traditional coupled resource pooling systems, are sufficient to allow for a safe operation of the system. In addition, the operational aspects of the system are transparent to operators as well as covered risk units, since payment is transferred in response to individually adaptable risk transfer structures and related to certain definable triggers in the context of the information pathways. Finally, the inventive system provides a new modality for optimizing the underlying risk transfer structure in the service of risk transfer and sharing of two coupled insurance systems by using several layers of different sharing, thereby allowing, for example, for combining the advantages of proportional and non-proportional risk transfer.

In one embodied variant, the switching device can, e.g., comprise capturing means that capture a transfer of payment assigned to one of the variable risk transfer segments from the first insurance system at the second payment-transfer module, wherein the assigned variable risk transfer segment is activated, and wherein the risk exposure of the first insurance system associated with the assigned variable risk transfer segment is transferred to the second insurance system. This embodiment variant has, inter alia, the advantage that also single risk segments can be activated allowing a distinct and discrete risk transfer from the first to the second resource pooling system.

In another embodied variant, the risk exposure of the first insurance system associated with the variable risk transfer segments of the top-down table is only transferred to the second insurance system if a seamless risk transfer function can be provided by the structure of risk transfer segments, which provide the risk transfer functionality by means of an assembly module. This embodied variant has, inter alia, the advantage that the problems of a non-continuous risk transfer structure are avoided, which, for example, can be a problem when processing the optimization of the risk transfer structure of the system, i.e. the underlying risk transfer functionality, by means of the assembly module.

In a further embodied variant, the risk transfer functionality is comprised of the plurality of stored, variable risk transfer segments, wherein the first resource pooling system comprises an interface module for accessing and adapting the assigned segment value of each of the variable risk transfer segments prior to the transfer of the payment sum from the first resource pooling system to the second resource pooling system. This embodied variant has, inter alia, the advantage that the risk transfer structure can be dynamically adjusted and, moreover, selected and/or optimized directly by the first resource pooling system or the associated insurance system.

In still another embodied variant, the assembly module of the switching device comprises means for processing risk-related component data and for providing data as to the likelihood of said risk exposure for one or a plurality of the pooled risk exposure components, in particular, based on risk-related component data, and wherein the receipt and preconditioned storage of payments from risk exposure components for the pooling of their risks can be dynamically determined based on the total risk and/or the likelihood of risk exposure of the pooled risk exposure components. This embodied variant has, inter alia, the advantage that the operation of the first and/or second resource-pooling system can be dynamically adjusted to changing conditions in relation to the pooled risk, as, for example, a change of the environmental conditions or risk distribution, or the like, of the pooled risk components. A further advantage is that the system does not require any manual adjustments, when it is operated in different environments, places or countries, because the size of the payments of the risk exposure components is directly related to the total pooled risk.

In one embodied variant, the assembly module of the switching device comprises means for processing risk-related component data and for providing information as to the likelihood of said risk exposure for one or a plurality of the pooled risk exposure components, in particular, based on risk-related component data, and wherein the receipt and preconditioned storage of payments from the first resource pooling system to the second resource pooling system for the transfer of its risk can be dynamically determined based on the total risk and/or the likelihood of risk exposure of the pooled risk exposure components. This embodied variant has, inter alia, the advantage that the operation of the first and/or second resource-pooling system can be dynamically adjusted to changing conditions of the pooled risk, as, for example, changes of the environmental conditions or risk distribution, or the like, of the pooled risk components. A further advantage is the fact that the system does not require any manual adjustments, when it is operated in different environments, places or countries, because the size of the payments of the risk exposure components is directly related to the total pooled risk.

In one embodied variant, the number of pooled risk exposure components is dynamically adjusted by means of the first resource-pooling system to a range where non-covariant, occurring risks covered by the resource-pooling system affect only a relatively small proportion of the total pooled risk exposure components at any given time. Analogously, the second resource pooling system can, e.g., dynamically adjust the number of pooled risk shares transferred from first resource pooling systems to a range where non-covariant, occurring risks covered by the second resource-pooling system affect only a relatively small proportion of the total pooled risk transfers from first resource pooling systems at any given time. This variant has, inter alia, the advantage that the operational and financial stability of the system can be improved.

In one embodied variant, the risk event triggers are dynamically adjusted by means of an operating module based on time-correlated incidence data for one or a plurality of risk events. This embodied variant has, inter alia, the advantage that improvements in capturing risk events or avoiding the occurrence of such events, e.g. by improved forecasting systems etc., can be dynamically captured by the system and dynamically affect the overall operation of the system based on the total risk of the pooled risk exposure components.

In another embodied variant, upon each triggering of an occurrence, where parameters indicating a risk event are measured, by means of at least one risk event trigger, a total parametric payment is allocated with the triggering, and wherein the total allocated payment is transferrable upon a triggering of the occurrence. The predefined total payments can, e.g., be leveled to any appropriate lump sum, such as, for example, a predefined value, or any other sum related to the total transferred risk and the amount of the periodic payments of the risk exposure component. This variant, inter alia, has the advantage that the parametric payments or the payments of predefined amounts, which, as in the embodied variant, may also depend on a first, second, third or a plurality of trigger levels, i.e. the different stages of triggers, and allow for an adjusted payment of the total sum that can, e.g., be dependent on the stage of the occurrence of a risk event, as triggered by the system.

In one embodied variant, a periodic payment transfer from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable by means of the monitoring module. As a variant, the request for periodic payment transfer can be interrupted automatically or waived by means of the monitoring module, when the occurrence of indicators for a risk event is triggered in the data flow pathway of a risk exposure component. These embodied variants have, inter alia, the advantage that the system allows for further automation of the monitoring operation, especially of its operation with regard to the pooled resources.

In a further embodied variant, an independent verification risk event trigger of the first and/or second resource pooling system is activated in cases when the occurrence of indicators for a risk event is triggered in the data flow pathway of a risk exposure component by means of the risk event triggers, and wherein the independent verification risk event trigger, additionally, issues a trigger in the event of the occurrence of indicators regarding risk events in an alternative data flow pathway with independent measuring parameters from the primary data flow pathway in order to verify the occurrence of the risk event at the risk exposure component. In this variant, the transfer of payments is only assigned to the corresponding risk exposure component, if the occurrence of the risk event at the risk exposure component is verified by the independent verification risk event trigger. These embodied variants have, inter alia, the advantage that the operational and financial stability of the system can thus be improved. In addition, the system is rendered less vulnerable relative to fraud and counterfeit.

In a embodied variant, a system is provided for adaptive operation of an autonomously operated risk-transfer systems by providing self-sufficient risk protection of a variable number of risk exposure components by means of an automated resource-pooling system capable of pooling resources and absorbing transferred risks, wherein the risk exposure components are connected to the resource-pooling system by means of a payment-transfer module configured for receiving and storing payments from the risk exposure components for the pooling of their risks. The risk-transfer systems can comprise or be associated with insurance systems, as e.g. primary insurance systems, or any kind of financial systems or business units capable of absorbing transferred risks. For example, the inventive system for risk-transfer can be applied to or extended to asset-based systems, as operational units of financial institutes etc. In this embodied variant, a switching device comprises a top-down table providing data structures for storing a plurality of variable risk transfer segments comprising an assigned segment value providing a measure for a segmented part of the pooled risk, wherein an adaptable risk transfer function is provided by the structure of the plurality of variable risk transfer segments by means of an assembly module. By means of a core engine of the switching device, a payment parameter is assigned to each variable risk transfer segment of the top-down table and accumulated over all variable risk transfer segments to a total payment sum, wherein the switching device comprises a capturing device for capturing payment transfer parameters from the risk exposure components to the payment-transfer module, and wherein, upon triggering a transfer of the total payment sum at the payment-transfer module, the risk exposure of the risk exposure component assigned to the transfer of the payment sum is transferred to the insurance system. The core engine comprises event-driven triggers for the triggering, in a data flow pathway, of measuring devices associated with the risk exposure components for the occurrence of a risk event, and wherein, in case of a triggering of an occurrence of a risk event in the data flow pathway, the corresponding variable risk segment is determined within the top-down table by means of the core engine based on the measured actual loss. In case of the occurrence of a risk event, an activation signal is generated by means of the switching device based on the determined variable risk segment and the measured actual loss, wherein the switching device triggers the activation of the resource-pooling system by means of the generated activation signal by transferring the activation to the resource pooling system to provide risk protection to the risk exposure components, and wherein the activation of the resource pooling system is based on the adaptable risk transfer function.

In addition to the system, as described above, and the corresponding method, the present invention also relates to a computer program product that includes computer program code means for controlling one or more processors of the control system in such a manner that the control system performs the proposed method; and it relates, in particular, to a computer program product that includes a computer-readable medium that contains therein the computer program code means for the processors.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
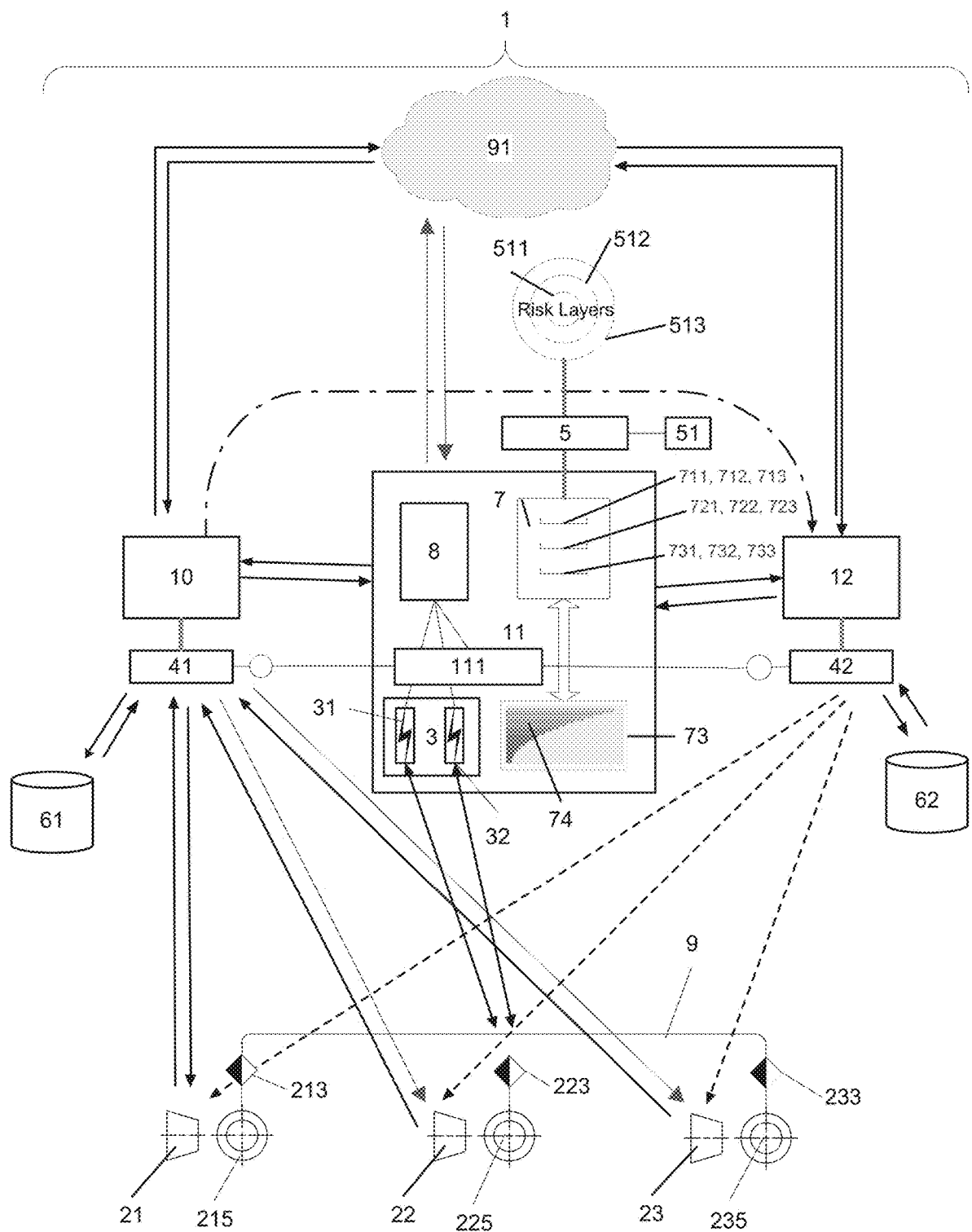
FIG. 1 shows a block diagram illustrating schematically an exemplary system 1 with an event-triggered switching device 11 for complementary switching of two coupled, autonomously operated insurance systems by providing a self-sufficient risk protection of a variable number of risk exposure components 21, 22, 23 by means of two automated resource-pooling systems 10, 12. The switching device 11 comprises an adaptable top-down table 7 providing data structures 711, 712, 713 for storing a plurality of variable risk transfer segments 721, 722, 723 comprising an assigned segment value 511, 512, 513, wherein an adaptable risk transfer function 73 is provided by the structure 74 of the segments 721, 722, 723.

FIG. 1 illustrates, schematically, an architecture for a possible implementation of an embodiment of the system 1 with an event-triggered switching device 11 for complementary switching of two coupled, autonomously operated insurance systems by providing self-sufficient risk protection of a variable number of risk exposure components 21, 22, 23 by means of two automated resource-pooling systems 10, 12 that are associated with the insurance systems. In FIG. 1, reference numeral 1 refers to a system for providing optimized risk protection related to risk exposure components 21, 22, 23 . . . with the associated coupled resource-pooling systems 10, 12. The resource-pooling systems 10, 12, which are coupled, steered and/or operated by means of the switching device 11, provide dynamic self-sufficient risk protection and a corresponding risk protection structure for the variable number of risk exposure components 21, 22, 23; i.e., units exposed to defined risk events, wherein the occurrence of such risk events is measurable and triggerable by means of appropriate measuring devices and/or trigger modules triggering in the data flow pathway of output data; i.e., measuring parameters of the measuring devices. The system 1 includes at least one processor and associated memory modules. The system 1 can also include one or more display units and operating elements, such as a keyboard and/or graphic pointing devices, such as a computer mouse. The resource-pooling systems 10 and 12 are technical devices comprising electronic means that can be used by service providers in the field of risk transfer or insurance technology for the purpose of risk transfer as it relates to the occurrence of measurable risk events. The invention seeks to capture, handle and automate by technical means complex related operations of the automated insurance systems, in particular in an effort of optimizing the interaction of coupled systems, and to reduce the operational requirements. Another aspect that is addressed is finding ways to synchronize and adjust such operations related to coupling or switching of resource pooling systems, which are directed at proved risk protection of risk exposed units based on technical means. In contrast to the standard practice, the resource-pooling systems also achieve reproducible, dynamically adjustable operations with the desired technical, repeating accuracy, because it is completely based on technical means, a process flow and process control/operation.

The switching device 11 and/or the resource-pooling systems 10 and 12 comprise an assembly module 5 for processing risk-related component data and for providing the likelihood of said risk exposure for one or a plurality of the pooled risk exposure components 21, 22, 23, etc. based on the risk-related component data. The resource-pooling systems 10 and 12 as well as the switching device 11 can be implemented as a technical platform, which is developed and implemented to provide risk transfer through a plurality of (but at least one) payment transfer modules 41 and 42. The risk exposure components 21, 22, 23, etc. are connected to the resource-pooling system 10 by means of the plurality of payment transfer modules 41 that are configured to receive and store payments from the risk exposure components 21, 22, 23 for the pooling of their risks in a payment data store 61. The storage of the payments can be implemented by transferring and storing component-specific payment parameters. The payment amount can be determined dynamically by means of the resource-pooling system 10 based on total risk of the overall pooled risk exposure components 21, 22, 23. For the pooling of the resources, the system 1 can comprise a monitoring module 8 that requests a periodic payment transfer from the risk exposure components 21, 22, 23, etc. to the resource-pooling system 1 by means of the payment transfer module 41, wherein the risk protection for the risk exposure components 21, 22, 23 is interrupted by the monitoring module 8, when the periodic transfer is no longer detectable by means of the monitoring module 8. In one embodied variant, the request for periodic payment transfers is automatically interrupted or waived by means of the monitoring module 8, when the occurrence of indicators for risk event is triggered in the data flow pathway of a risk exposure component 21, 22, 23. Analogously, the first resource-pooling system 10 is connected to the second resource-pooling system 12 of the second insurance system by means of a second payment-transfer module 42 that is configured for receiving and storing payments from the resource-pooling system 10 of the first insurance system for the transfer of risks associated with the pooled risks of the risk exposure components 21, 22, 23 from the first insurance system 10 to the second insurance system 12. The coupling and switching of the two complementary, autonomously operated resource pooling systems 10, 12 is achieved by the event-triggered switching device 11 for generating and transmitting appropriate steering signals to the first and second resource pooling systems 10, 12.

As indicated in FIG. 1, the system 1 includes a data storing module for capturing the risk-related component data and multiple functional modules; e.g., namely the payment transfer modules 41 and 42, the core engine 3 with the risk event triggers 31, 32, the assembly module 5 or the operating module. The functional modules can be implemented at least partly as programmed software modules stored on a computer readable medium, connected as fixed or removable to the processor(s) of system 1 or to associated automated systems. One skilled in the art understands, however, that the functional modules can also be implemented fully by means of hardware components, units and/or appropriately implemented modules. As illustrated in FIG. 1, system 1 and its components, in particular the first and second resource pooling systems 10, 12, the switching device 11, the trigger modules 31, 32, the measuring devices 215, 225, 235 with the interfaces 213, 223, 232, the assembly module 5, and the payment transfer modules 41, 42, can be connected via a network 91, such as a telecommunications network. The network 91 can include a hard-wired or wireless network; e.g., the Internet, a GSM network (Global System for Mobile Communication), an UMTS network (Universal Mobile Telecommunications System) and/or a WLAN (Wireless Local Region Network), and/or dedicated point-to-point communication lines. In any case, the technical electronic money-related setup for the present system comprises adequate technical, organizational and procedural safeguards to prevent, contain and detect threats to the security of the structure, particularly counterfeiting threats. The resource-pooling systems 10, 12 comprise, furthermore, all the necessary technical means for electronic money transfer and link-up association; e.g., as initiated by one or more associated payment transfer modules 41, 42 via an electronic network. The monetary parameters can be based on any possible electronic and transfer means, such as, e.g., e-currency, e-money, electronic cash, electronic currency, digital money, digital cash, digital currency, or cyber currency etc., which can only be exchanged electronically. The first and second payment data stores 61, 62 provide the means for associating and storing monetary parameters associated with a single of the pooled risk exposure components 21, 22, 23. The present invention can involve the use of the mentioned networks, such as, e.g., computer networks or telecommunication networks, and/or the internet and digital stored value systems. Electronic funds transfer (EFT), direct deposit, digital gold currency and virtual currency are further examples of electronic money modalities. Also, transfers can involve technologies such as financial cryptography and technologies for enabling such transfers. For the transaction of the monetary parameters, it is preferable that hard electronic currency is used, without the technical possibilities for disputing or reversing charges. The resource-pooling systems 10, 12 support, for example, non-reversible transactions. The advantage of this arrangement is that the operating costs of the electronic currency system are greatly reduced by not having to resolve payment disputes. However, this way, it is also possible for electronic currency transactions to clear instantly, making the funds available immediately to the systems 10, 12. This means that using hard electronic currency is rather akin to a cash transaction. However, also conceivable is the use of soft electronic currency, such as currency that allows for the reversal of payments, for example having a "clearing time" of 72 hours, or the like. The way of the electronic monetary parameter exchange applies to all connected systems and modules related to the resource-pooling systems 10, 12 of the present invention, such as, e.g., the first and second payment transfer modules 41, 42. The monetary parameter transfer to the first and second resource-pooling system 10, 12 can be initiated by a payment-transfer module 41 rsp. 42 or upon request by the related resource-pooling system 10 or 12.

The system 1 comprises an event-driven core engine 3 comprising risk event triggers 31, 32 for triggering component-specific measuring parameters in the data flow pathway 213, 223, 233 of the assigned risk exposure components 21, 22, 23. The data flow pathway 213, 223, 233 can, e.g., be monitored by the system by means of measuring devices 215, 225, 235 that are connected to a data flow pathway 9 via the interfaces 213, 223, 233; in particular, it can be monitored by the resource-pooling systems 10 and/or 12 and/or the switching device 11, thereby capturing component-related measuring parameters of the data flow pathway 213, 223, 233 at least periodically and/or within predefined time periods. According to an embodied variant, the data flow pathway 213, 223, 233 can, for example, also be dynamically monitored by the system 1, such as by triggering component-measuring parameters of the data flow pathway 213, 223, 233 that are transmitted from associated measuring systems 215, 225, 235. Triggering the data flow pathway 213, 223, 233, which comprises dynamically recorded measuring parameters of the concerned risk exposure components 21, 22, 23, the system 1 is able to detect the occurrence of predefined risk events based on predefined trigger parameters. Further, the system 1 can, e.g., also dynamically monitor different stages during the progress of the impact of a risk event on the risk exposure component 21, 22, 23 in order to provide appropriately adapted and gradated risk protection for a specific risk exposure component 21, 22, 23. Such a risk protection structure is based on received and stored payments from the related risk exposure component 21, 22, 23 and/or related to the total risk of the resource-pooling system 10, based on the overall transferred risks of all pooled risk exposure components 21, 22, 23.

The switching device 11 comprises a top-down table 7, e.g. realized as a searchable, hierarchically structured data hash table. The top-down table 7 provides hierarchical data structures 711, 712, 713 for storing a plurality of variable risk transfer segments 721, 722, 723 by means of assigned segment values 511, 512, 513. In this way, the i-th variable risk transfer segment 721, 722, 723 comprises the i-th measure for a part of a segmented layer, i.e. a part of the i-th risk contribution, of the total pooled risk. By means of the measures of the parts of the segmented risk layers of the pooled risk, an adaptable risk transfer function 73 is provided by the structure 74 of the plurality of variable risk transfer segments 721, 722, 723 by means of the assembly module 5. For example, the risk transfer function 73 can be generated by means of the assembly module 5 by interpolating the assigned segment values 511, 512, 513 as support points or interpolation points. For connecting the supporting interpolation points, i.e. the segment values 511, 512, 513, structured by the top-down structure of the variable risk transfer segment 721, 722, 723, the assembly module 5 can provide a polynomial or any other appropriate approach for the risk transfer function 73, linking the different segment values 511, 512, 513 to each other. The risk transfer function 73 generated by the assembly module 5 and applied to the structure 74 can e.g. comprise an appropriate parameterization or interpolation function, as e.g. any appropriate continuous and/or stepless and/or smooth and/or analytic and/or polynomial and/or lagrangian function. However, the assembly module 5 also can select simpler functions to the structures 74, as e.g. a convex and/or concave and/or exponential structure and function, respectively, in order to provide the correct risk transfer. As a border case, the risk transfer structure can even e.g. adopt a typical stop-loss structure based on the segment values 511, 512, 513. The selection of the appropriate risk transfer function 73 can e.g. be performed semi or fully automated by the system 1 from a predefined set of risk transfer functions based on e.g. definable selection criteria. As a variant, the assembly module 5 can also provide the risk transfer, i.e. the appropriate transfer function 73, by connecting the assigned segment values 511, 512, 513 as support points of the risk transfer interpolating or building otherwise a smooth connection over all assigned segment values 511, 512, 513, e.g. in a continuously adjustable manner. As an additional embodiment variant, the input to the assembly module 5 for providing the risk transfer function 73 can e.g. be directly parameters of a parameterizable form of a risk transfer function 73, i.e. any appropriate continuous and/or stepless and/or smooth and/or analytic and/or polynomial and/or lagrangian and/or convex/concave and/or exponential function. In the latter embodiment variant, the risk transfer function 73 of the system 1 is not based on risk transfer segments 721, 722, 723 with assigned segment values 511, 512, 513, but directly on the parameters of the function representing the risk transfer structure 73. Therefore, in this case, the adjustment or optimization of the risk transfer by the first insurance system 10 and/or the risk exposed components is directly achieved by the operational parameters of an appropriate risk transfer function 73. In contrast, as a further variant, the risk transfer performed by the system 1 can e.g. directly be based on the variable risk transfer segments 721, 722, 723 by means of assigned segment values 511, 512, 513, wherein the value of the assigned segment values 511, 512, 513 denote the switching threshold of the risk transfer, transferring the risk above or below the segment values 511, 512, 513 to the second insurance system 12. In this embodiment variant, the risk transfer provided by the structure 74 is not stepless, however, in the limes (edge) to very small width of the variable risk transfer segments 721, 722, 723, the risk transfer segments 721, 722, 723 approach a seamless and/or stepless risk transfer function by means of assigned segment values 511, 512, 513, more and more.

In a further embodiment variant, the segment values 511, 512, 513 of the risk transfer segments 721, 722, 723 are self-adapted by means of the system 1, thereby optimizing the resulting risk transfer function 73. However, the optimization can also be performed by dedicated external means. The system 1 and/or the dedicated external means can e.g. operate the optimization until a local or global maximum or minimum, respectively, is achieved, or until a predefined target value is achieved. Finally, the optimization can be based on different sets of optimization criteria or by a specific selection a certain set of optimization criteria. As a condition for optimization, it is clear that the risk transfer structure 74 and the assigned risk transfer function 73 should be related to the risk assumed or predicted, and preferable, if the risk assessment is correct, with the occurrence of the corresponding risk events within the defined time frame. In an embodiment variant, the trade-off between frequency and severity can be considered, as a boundary condition, to achieve a preferred or optimized risk transfer, wherein the severity is the conditional expected loss (CEL) as a consequent of the occurrence of a risk event and the frequency of the occurrence of the risk event and/or the frequency of loss is the probability of first dollar loss (PFL). In general, to define the optimization parameter, an approach can e.g. be chosen, where X denotes a loss assessed by the first insurance system 10 in absence of a coupled second insurance system 12, wherein X is assumed as a non-negative random variable on the probability space $(\Omega, f, \Psi)$ with a cumulative distribution function $F_x(x)=\Psi(X \leq x)$ and $E[X]<\infty$. The optimization parameters are concerned with the optimal partitioning of X into $f(X)$ and $R_f$, where $X=f(X)+R_f(X)$. Here $f(X)$, satisfying $0 \leq f(X) \leq X$, captures the portion of loss that is transferred to the coupled second insurance system 12, while $R_f$ is the residual loss retained by the first insurance system 10, i.e. where the activation of the second insurance system 12 does not occur by means of the switching device 11. In other words, $f(X)$ could be referenced as the ceded loss function while $R_f(x)$ is the retained loss function. An optimization criterion can e.g. be to vary the parameters in order to minimize the variance of the retained loss of the first insurance system 10, for example, under the assumption that the payment transferred from the first insurance system 10 to the second insurance system 12 is generated by an expected value principle. However, the optimization criteria can e.g. be extended any direction including further optimization criteria or payment transfer principles, as e.g. considering mean-variance premium principles including the standard deviation principle and the variance principle. Other optimization criteria can e.g. be achieved by applying risk measures such as the value at risk (VaR) or the conditional value at risk (CVaR) for quantifying the risk, in particular e.g. by minimizing VaR or CVaR of the total risk exposure of the first insurance system 10 under the assumption of the expected value premium principle. Further, constraints can e.g. be incorporated reflecting either the profitability guarantee or the maximum amount of transferable payments from the first insurance system 10 to the second insurance system 12. However, further optimization criteria and constraints can be applied in any form need to approach a specific risk transfer problem by means of the system 1. Finally, in an embodied variant, the risk exposure of the first insurance system 10 associated with the variable risk transfer segments 721, 722, 723 of the top-down table 7 is only transferred to the second insurance system 12, when a seamless risk transfer function 73 can be provided by the structure 74 of risk transfer segments 721, 722, 723, thus providing risk transfer function 73 by means of an assembly module 5. The data structure 711, 712, 713 of the top-down table 7 for storing variable risk transfer segments 721, 722, 723 can at least, e.g., comprise parameters for each of the stored risk segments 721, 722, 723 indicating the size of the variable risk transfer segments 721, 722, 723 and the payment parameters 731, 732, 733 assigned to each variable risk transfer segment 721, 722, 723 of the top-down table 7, and wherein the data structure 711, 712, 713 comprises a parameter indicating the accumulated total payment sum.

By means of a core engine 3 of the switching device 11, a payment parameter 731, 732, 733 is assigned to each variable risk transfer segment 721, 722, 723 of the top-down table 7 for the transfer of a specific part of the pooled risks of the first resource pooling system 10 based on the risk transfer function to the second resource pooling system 12.

The payment parameters 731, 732, 733 are accumulated to a total payment sum, wherein the switching device 11 comprises a capturing device 111 for capturing payment transfer parameters 731, 732, 733 from the first payment-transfer module 41 to the second payment-transfer module 42. Upon triggering a transfer of the total payment sum at the second payment-transfer module 42, the risk exposure of the first insurance system 10 associated with the variable risk transfer segments 721, 722, 723 has been transferred to the second insurance system 12. In an embodied variant, the switching device 11 can further comprise capturing means 11 for capturing a transfer of payment assigned to one of the variable risk transfer segments 721, 722, 723 from the first insurance system 10 at the second payment-transfer module 42, and wherein the assigned variable risk transfer segment 721, 722, 723 is activated, and wherein the risk exposure of the first insurance system 10 associated with the assigned variable risk transfer segment 721, 722, 723 is transferred to the second insurance system 12.

Further, the core engine 3 comprises event-driven triggers 31, 32 for triggering action in a data flow pathway 213, 223, 233 of measuring devices 215, 225, 235 associated with the risk exposure components 21, 22, 23 a risk event occurs. The data flow pathways 213, 223, 233 can be connected to an overall data flow pathway 9 and/or to the network 91, as described above. The measuring devices 215, 225, 235 comprise the interfaces 213, 223, 233 for the purpose of allowing data access to measuring devices 215, 225, 235. If an occurrence of a risk event is triggered in the data flow pathway 9, the corresponding variable risk segment 721, 722, 723 is determined within the top-down table 7 by means of the core engine 3 based on the measured actual loss, and a corresponding activation signal is generated by means of the switching device 11 based on the determined variable risk segment 721, 722, 723 and the measured actual loss, wherein the switching device 11 triggers the complementary activation of the first and second resource-pooling systems 10, 12 by means of the generated activation signal by transferring the activation to the first and/or second resource pooling system 10, 12 in order to provide risk protection to the risk exposure components 21, 22, 23. In this way, the present invention provides the utmost in flexibility and an optimal technical solution for coupled and complementary switched insurance systems with associated resource pooling systems 10, 12. The invention allows for combining the advantages of proportional and non-proportional risk transfer structures. Further, as described above, the inventive system 1 is based on an explicit optimization process, wherein the optimization criteria can also be implemented for a consideration of boundary criteria, as provided by the requirements of the risk exposed components 21, 22, 23 and/or the first and/or second resource pooling systems. In addition, it is a fundamental aspect of the system that the transferred risk shares can be made to depend only on the loss size that is associated with the impact of a risk event with regard to a risk exposure component 21, 22, 23. The operational mode, in which the risk shares depend on the loss size, can be optimized by the appropriate means of the system 1. The need for an optimized risk transfer intensifies with increasing loss size; thus, for the operational stability of risk transfer systems, it can be technically advantageously to ensure that a risk transfer is implemented as a monotonously increasing function of the loss size. The optimization criteria can, e.g., also be compared to the overall risk that is transferred to the first resource pooling system 10, i.e., the risk portfolio of the first resource pooling system 10, before and after the risk transfer. In this way, the system 1 is able to optimize by means of adapted optimization criteria and/or variable risk transfer segments 721, 722, 723, with the segment values 511, 512, 513, the pay-off between the transferred payment parameters (premiums) and an appropriate measure for the benefit to the first resource pooling system (e.g., decreased volatility, decreased capital costs, etc.), with its possible impact on the operational stability of the system 1 or the coupled insurance systems 10, 12. Further boundary criteria for the optimization process can comprise volatility reduction vs. payments transferred to the second resource pooling system (e.g., reinsurance premium), cost of pooled resource reduction (capital reduction at the first resource pooling system 10) vs. reinsurance premium, increase in balance of pooled risk (risk portfolio) of the first resource pooling system 10 vs. transferred payments (reinsurance premium), and any combination thereof, etc. In particular, the present invention can be a technical solution for insurance systems that are only coupled to one secondary insurance system, and/or in cases when the overall retention is volatile, and/or the portfolio is (partially) unbalanced and/or regulatory constraints hinder meeting profitability operation of the insurance system.

One embodied variant provides for the segmentation to be directly definable and/or adaptable by the first resource pooling system 10. Therefore, for the risk transfer function 73, which is composed of the plurality of stored, variable risk transfer segments 721, 722, 723, the first resource pooling system 10 can comprise an interface module for accessing and adapting the assigned segment value of each of the variable risk transfer segments 721, 722, 723 prior to the transfer of the payment sum from the first resource pooling system 10 to the second resource pooling system 12. The assembly module 5 of the switching device 11 can comprise means for processing risk-related component data and for providing the likelihood of said risk exposure for one or a plurality of the pooled risk exposure components 21, 22, 23 based on risk-related component data, and wherein the receipt and preconditioned storage 61 of payments from risk exposure components 21, 22, 23 for the pooling of their risks can be dynamically determined based on total risk and/or the likelihood of the risk exposure of the pooled risk exposure components 21, 22, 23. The assembly module 5 of the switching device 11 can also comprise means for processing risk-related component data and for providing the likelihood of said risk exposure with regard to one or a plurality of the pooled risk exposure components 21, 22, 23 based on risk-related component data, and wherein the receipt and preconditioned storage 6 of payments from first resource pooling system 10 to the second resource pooling system 12 for the transferring of its risk can be dynamically determined based on total risk and/or the likelihood of the risk exposure of the pooled risk exposure components 21, 22, 23. In one embodied variant, the risk event triggers 31, 32 can be dynamically adapted by means of an operating module based on time-correlated incidence data for one or a plurality of risk events. Upon each triggering 31, 32 of an occurrence of measuring parameters indicating a risk event by means of at least one risk event trigger 31, 32, a total parametric payment is allocated by the triggering, and wherein the totally allocated payment can be transferred upon the triggering event of the occurrence.

Figure 2:
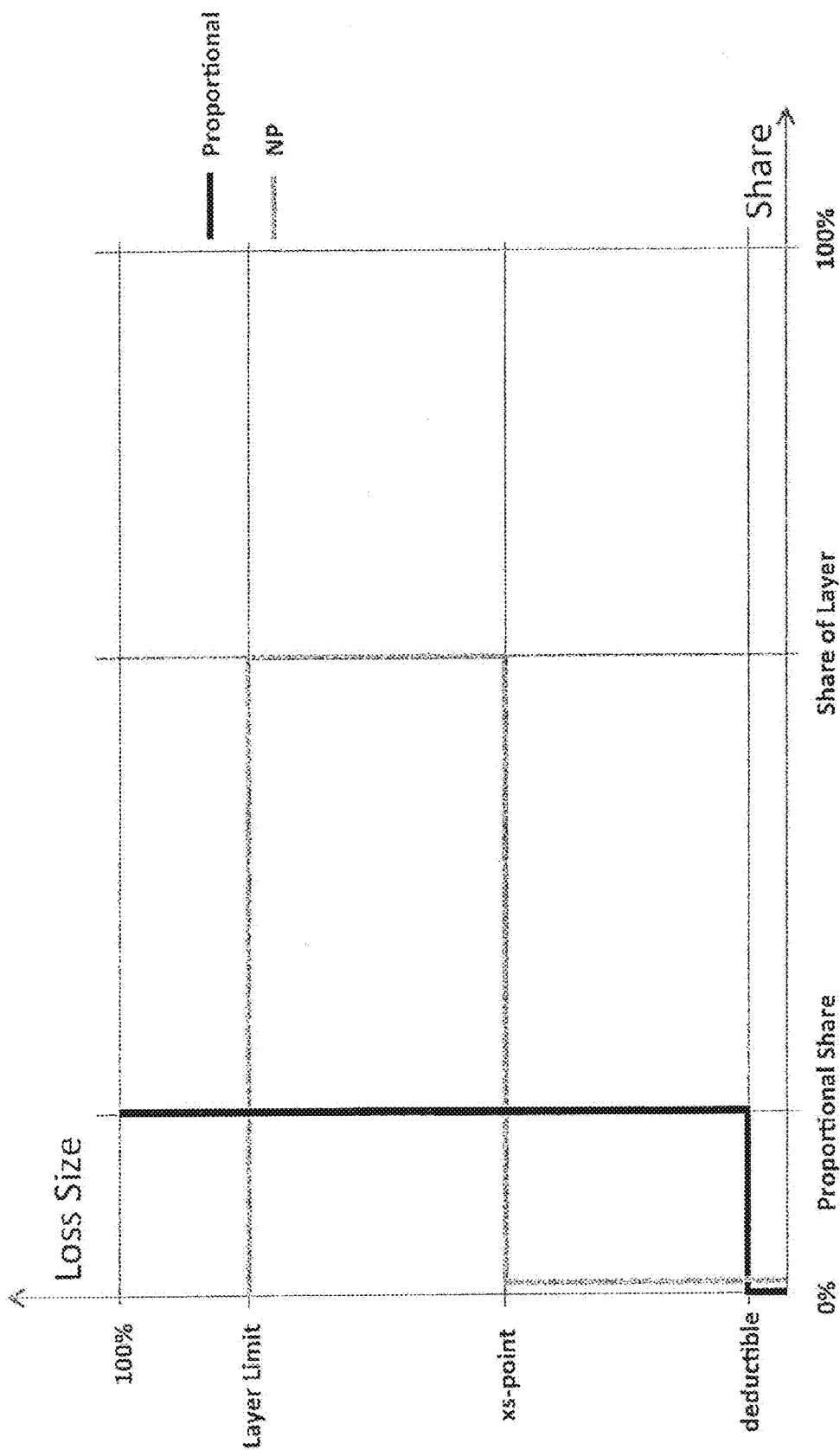
FIG. 2 shows a block diagram illustrating schematically the coupling structure of prior art systems using either a proportional or non-proportional switching structure.
Figure 3:
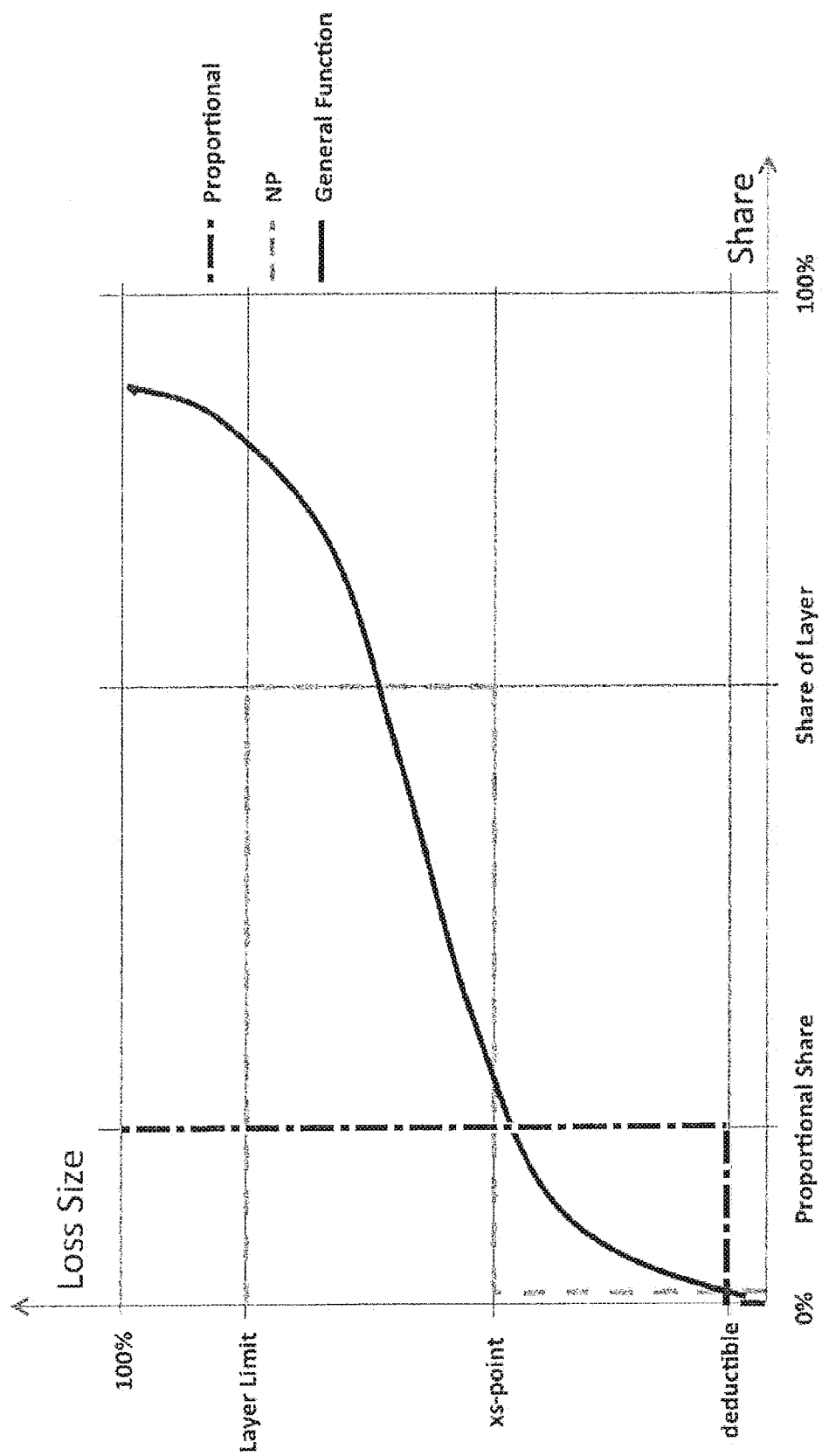
FIG. 3 shows a block diagram illustrating schematically the coupling structure of prior art systems using either a proportional or non-proportional switching structure, in contrast to an optimized coupling structure based on an optimized risk transfer function.
Figure 4:
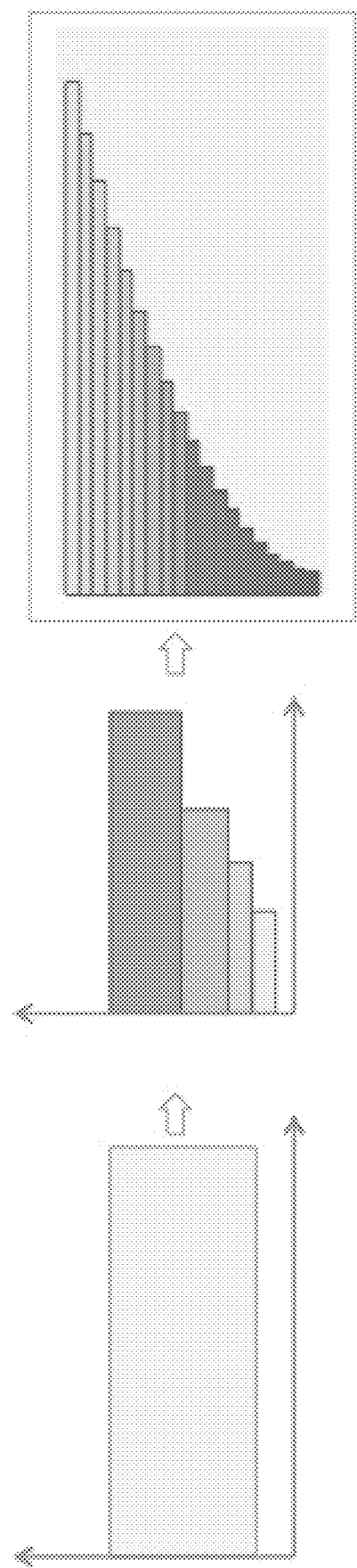
FIGS. 4 and 5 show block diagrams illustrating schematically an exemplary segmentation of a risk transfer structure by a plurality of variable risk transfer segments 721, 722, 723 by means of a top-down table 7 of the switching device 11, comprising an assigned segment value 511, 512, 513 for a segmented part of the pooled risk, i.e. a particular risk contribution 51$i$ to the total pooled risk of the first resource pooling system.
Figure 5:
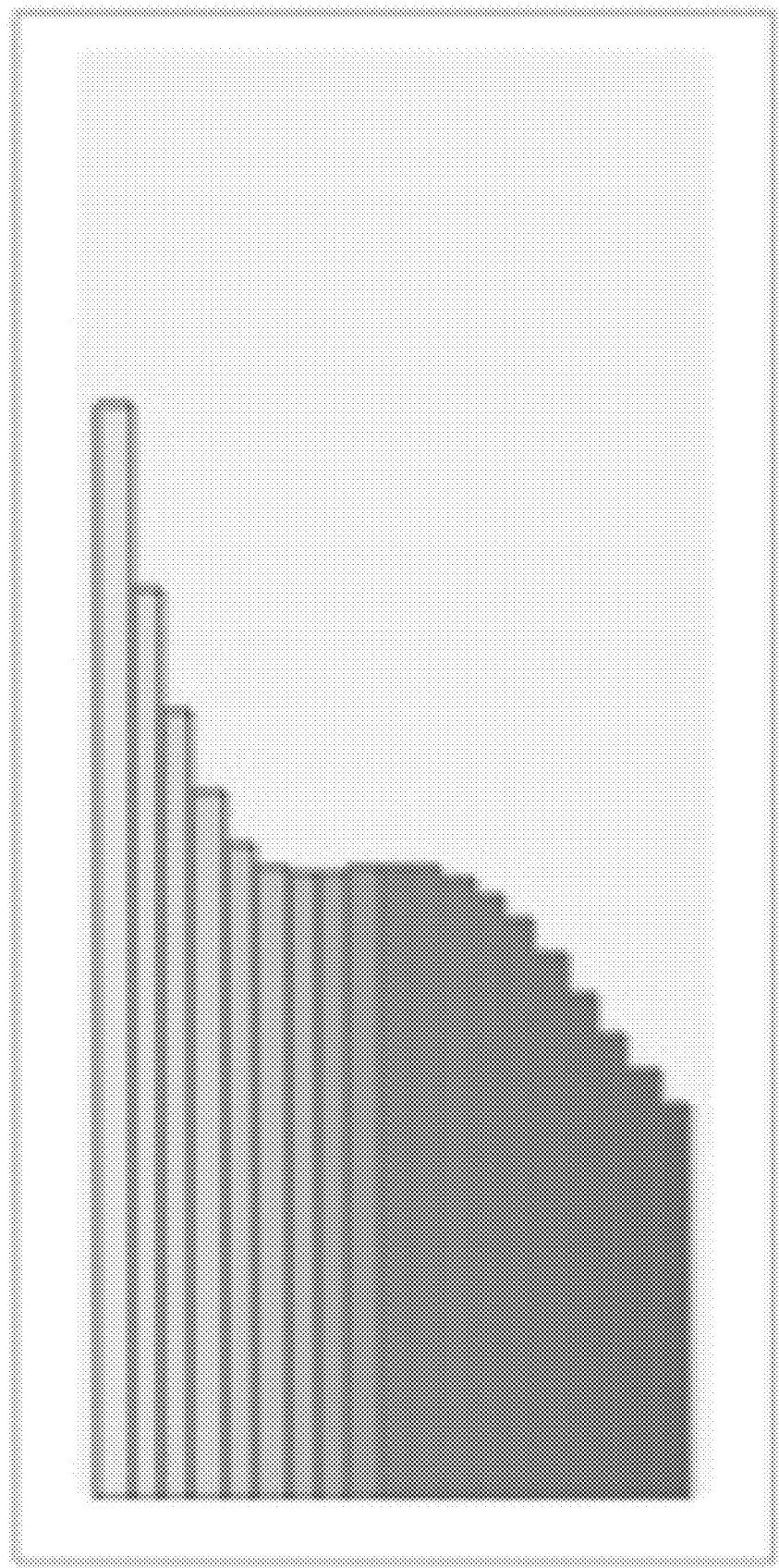

One key point of the present invention addresses the issue of how to determine by means of the system 1, on a low-key level, optimal risk transfer functions; i.e., seeking optimized functions Ceded Share=f(Loss Size). From the prior art systems, two basic concepts of risk transfer are known; i.e., coupling the independently operated insurance systems 10, 12: which are risk transfer by means of proportional or quota share (QS) structures, and risk transfer by means of non-proportional (NP) structures. FIG. 2 shows the loss size as a function of ceded share (also sometimes represented by the inverse: Ceded Share=f(Loss Size)). Both concepts are prone to drawbacks in terms of operational instabilities; they are, furthermore, not flexible in order to allow for implementing a truly optimized risk transfer structure with regard to the coupled systems 10, 12. Further, though, from an economical and operative point of view, the NP-risk transfer structure seems to be closer to meeting the purpose of appropriate risk transfer, the QS solutions are still the standard in many fields of risk transfer technology. In the prior art, the decision as to which system should be chosen is merely based on the pros and contras of the two risk transfer structures. While the QS risk transfer structure has more transparency with respect of loss experience xs deductibles, and it is simpler as well as more transparent, the risk transfer in systems based on the QS-structure is in the near-to-frequency area, thereby un-economical; further, the operational steps and costs are cumbersome, even without triggered losses; this is accompanied by a great increase of the risk of the conflict potential in case of a deviating risk assessment. In contrast, NP-risk transfer structured systems are capable of considering individual risk assessments, need fewer operational steps, less effort and costs and demonstrate superior compliance with the concepts of optimized capital management. However, NP-structured systems separate the operation of the second resource pooling system 12, i.e. the risk transfer-taker from direct loss measurement and control. Further, in some aspects, it is arbitrary due to the determination of the xs-point, i.e. the point of risk transfer, and the loss mitigation costs sharing is often a problem that cannot be solved properly by technical means. Finally, these systems are restricted to a non-continuous risk-transfer structure. As mentioned previously, the need for risk transfer intensifies with increasing loss size. Thus, as FIG. 3 shows, it should be possible to implement a risk transfer structure, e.g., based on a monotonously increasing risk transfer structure. However, there is no way to overcome the aforesaid drawbacks of the prior art systems. In particular, a systematic approach for implementing an explicitly (at least piecewise) continuous structure in connection with risk transfer is not possible by the prior art. Moreover, the prior art systems are not able to consider given appropriate optimization criteria for determining an optimal risk transfer structure or dynamically adapt the structure to changing environmental conditions.

In one embodied variant, the assembly module 5 can, e.g., define an appropriate optimization criterion (i.e. a functional term acting on a profit-loss distribution function) based on the total pooled risk at the first insurance system 10, such that the criterion can be minimized by means of the assembly module 5 once an "optimal" risk transfer function has been determined. Therefore, both are determined by means of the assembly module 5, the profit-loss distribution function before and after risk transfer via the risk transfer structure. The risk transfer is linked to transfer costs, i.e. a premium, wherein the payment transfer can comprise anything, expected loss (EL) for the risk transfer itself but also all types of cost components (capital costs, operational costs etc.). These costs need to be compared with reasonable benefit measure parameters, e.g. capital relief cost-benefits following given regulatory frameworks, financial rating targets, volatility costs, or the like. Typically, it is not possible to arrive at an analytical solution, since the data describing the pooled risk, i.e. portfolio data, are normally not available in a "closed" format. Thus, the assembly module 5 starts optimization based on a plain numerical approach. However, the optimization, by means of the assembly module 5, can, e.g., also be based on an analysis of possible boundary conditions, as given by the operational conditions of the first resource pooling system 10, together with an analysis of the composition of the single risks of the total pooled risks at the first resource pooling system. In a further embodied variant, both described solutions can be combined for a determination of the optimal risk transfer structure.

Apart from some basic boundary conditions, like acceptability by regulatory bodies, general legal constraints, the assembly module 5 can, e.g., comprise means to carry out operations based on simulated parameters first, in order to evaluate the potential, stress test model quality, parameter and optimization criteria sensitivity etc. These simulated parameters can be optimized, e.g., by variation of the parameters based on statistical models.

Figure 6:
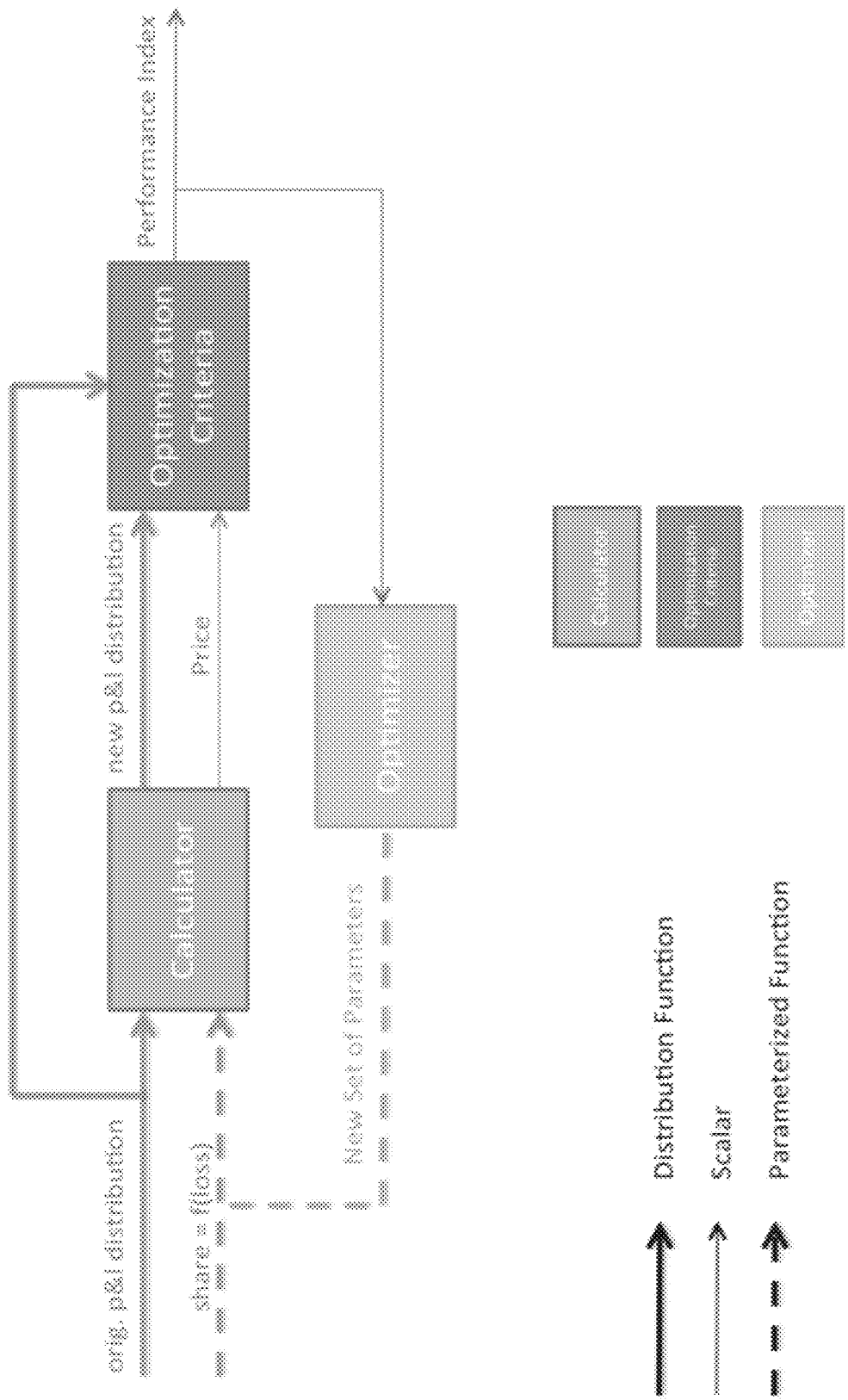
FIG. 6 shows block diagrams illustrating schematically an exemplary overall optimization process, as conducted by the calculation engine of the assembly module 5. To start the optimization process by means of the calculation engine of the assembly module 5, standard values, as widely accepted quantities like the ratio between total risk transfer costs divided by the capital costs, can e.g. be used.

For that reason, the assembly module 5 can comprise a calculation engine 51. The task of this calculation engine 51 is to generate profit-loss-distributions before and after risk transfer based on a given risk transfer structure or function. Out of these resulting P-L-distributions, the respective financial key figures, used by the optimization criterion (functional), can be determined by the assembly module 5. In addition, a pricing simulation producing a realistic estimate of the gross premium, which is transferred from the first 10 to the second 12 resource pooling system for the respective risk transfer, is generated. In view of the further technical aspects, the assembly module determines a risk transfer function, which is "parameterizable". It is advantageous for the number of parameters to be kept as low as possible by the assembly module 5 or the calculation engine, respectively, due to the highly over-proportional growth in complexity that occurs with an increasing number of parameters. In one embodied variant, for example, a polynomial approach is chosen. In another embodied variant, the parameterization is chosen whereby two established risk transfer functions, one based on a proportional structure and one on a non-proportional structure, are among the solutions, and where the underlying optimization algorithm of the assembly module can converge. However, for the present invention, depending on the underlying portfolio, i.e. on the structure of the total pooled risks, it is not necessary for the optimal solution to be continuous. It is even conceivable to base the optimization process on a non-monotonic (increasing) risk transfer structure. In one embodied variant, a standard and robust numerical optimization algorithm can be used in order to ensure, general acceptance and costs control. It is evident that for such an optimization, which is based on iterations, the determination by means of the assembly module 5 needs to be batch-process-compatible, and it must offer the possibility for running on fast hardware platforms, which might be advantageous. To start the optimization process by means of the calculation engine 51 of the assembly module 5, available standard values, as widely accepted quantities like the ratio between total risk transfer costs divided by the capital costs can be used, for example. The overall optimization process, as conducted by the calculation engine 51 of the assembly module 5, is illustrated in FIG. 6.

The triggers 31, 32 can comprise triggering for the occurrence of a predefined risk event or stages of the impact of predefined risk events by means of the measuring devices 215, 225, 235. The risk events can, e.g., be any transferable risk that meets the criteria for risk transfer or insurance operability. The concept of insurable risk underlies all decisions and signaling as conducted by the system 1 and the switching device 11, respectively. In summary, criteria for defining the possible risk events, captured by the system 1, can, for example, be based on requiring a sufficiently large number of similar exposure units, a definite loss, an accidental loss, i.e. a size of loss outside the control of the risk exposed component 21, 22, 23; i.e., the loss is meaningful from the perspective of the risk exposed component 21, 22, 23, affordable premiums, calculable and/or measurable and/or parametrizable losses, a limited risk of catastrophically large losses, i.e. requiring that the transferable risk concern losses which are independent and non-catastrophic. Moreover, for a risk to be transferable, i.e. capturable by the system 1, several things can be preconditioned: (i) The resource pooling system 1 must be able to determine a premium high enough to cover not only claims expenses but also to cover the first resource pooling system's effort. For example, it is possible to exclude risks, which are catastrophic or so large that no isolated resource pooling system can cover the loss. (ii) The nature of the loss must be definite and measurable. (iii) The loss can be defined as random in nature, otherwise the transferred risk can engage in adverse selection (antiselection). In any case, the risk events can comprise any transferable risk whose occurrence is measurable by measuring devices 215, 225, 235. The triggers 31, 32 can, e.g., also comprise additional triggers, triggering in other criteria and boundary conditions, which are not mentioned here. It is also possible that the trigger 31,32 are adapted dynamically by means of the system 1, when new measuring devices 215, 225, 235 are detected by the system 1, and/or new risk events have to be covered by the system 1, i.e. new risks are pooled by the first resource pooling system 10.

In addition to the adaptation of the triggers 31, 32, 33, the amount of requested payments from the risk exposure components 21, 22, 23 can be accordingly adjusted by the system 1 and/or the resource-pooling system 11. Therefore the receipt and preconditioned storage 61 of payments from risk exposure components 21, 22, 23 for the pooling of their risks can be determined dynamically, based on total risk and/or the likelihood of the risk exposure of the pooled risk exposure components 21, 22, 23 to improve the operational and functional security of the system 1 even further. The number of pooled risk exposure components 21, 22, 23, can be dynamically adapted by means of the system 1 and/or the resource-pooling system 10 to a range where non-covariant, occurring risks that are covered by the resource-pooling system 1 affect only a relatively small proportion of the total pooled risk exposure components 21, 22, 23 at any given time. In another variant, the pooled risk transfers from first resource pooling systems 10 can also be dynamically adaptable by means of the second resource-pooling system 12 to a range where non-covariant, occurring risks covered by the second resource-pooling system 12 affect only a relatively small proportion of the total pooled risk transfers from first resource pooling systems 10 at any given time. The total risk of the pooled risk exposure components 21, 22, 23 comprises a different segmentable risk contribution 511, 521, 531 of each pooled risk to a risk exposure component 21, 22, 23, which is associated with risk exposure in relation to the occurrence of a risk event. The triggering parameters of the covered risk events can be contained and stored in a predefined searchable table, such as, e.g., an appropriately structured hash table, of predefined risk events, respectively risk event parameters. The corresponding losses occur as a consequence of the occurrence of a risk event at risk exposure components 21, 22, 23 . . . with regard to one of the searchable risk events; i.e., the possible need of risk exposure components 21, 22, 23, . . . to be covered by the pooled resources of the resource-pooling systems 10,12 is linked to the risk of the occurrence of a risk event that requires resolving the loss in order to avoid operational interruption, or the like.

In case of triggering an occurrence of a risk event on the data flow pathway 213,223,233 of a risk exposure component 21, 22, 23, i.e. if triggering of an occurrence of a risk event goes into effect in the data flow pathway 213, 223, 233, a corresponding trigger-flag, e.g., can be activated by means of the resource-pooling system 10, and a parametric or otherwise predefined transfer of payments can be assigned to this corresponding trigger-flag. A loss associated with the occurrence of a risk event can, e.g., be distinctly covered by the resource-pooling system 10, based on the respective trigger-flag and based on the received and stored payment parameters from risk exposure components 21, 22, 23 via the parametric or otherwise predefined transfer from the resource-pooling system 10 to the risk exposure component 21, 22, 23, etc. The payment transfer modules 41,42 can, as an input device, comprise one or more data processing units, displays and other operating elements, such as a keyboard and/or a computer mouse or another kind of pointing device. As mentioned previously, the receiving operation of the payments with regard to the risk exposure components 21,22, 23 is monitored based on the stored component-specific payment parameters in the payment data store 61. The different components of the system 1, such as, e.g. the resource pooling systems 10, 12, the switching device 11, the payment transfer modules 41, 42, the core engine 3 and the assembly module 5 can be connected via a network 91 for signal transmission. The network 91 can comprise, e.g., a telecommunications network, such as a hard-wired or wireless network, e.g., the internet, a GSM network (Global System for Mobile Communications), an UMTS network (Universal Mobile Telecommunications System) and/or a WLAN (Wireless Local Area Network), a Public Switched Telephone Network (PSTN) and/or dedicated point-to-point communication lines. The payment transfer modules 41,42 and/or core engine 3 and the assembly module 5 can also comprise a plurality of interfaces for connecting to the telecommunications network while adhering to the transmission standard or protocol. In one embodied variant, the payment transfer module 41,42 can also be implemented as an external device relative to the system 1, which provides the risk transfer service via the network for signal transmission, e.g., by a secured data transmission line.

As mentioned, a loss associated with the risk event and allocated by a pooled risk exposure component 21, 22, 23 can, e.g., be distinctly covered by the resource pooling system 10 of the first insurance system by means of a transfer of payments from the first resource-pooling system 10 to said risk exposure component 21, 22, 23, wherein a second transfer of payment from the second resource pooling system 12 to the first resource pooling system is triggered by means of the generated activation signal based on the determined variable risk segment within the top-down table and the measured actual loss of the risk exposure component 21, 22, 23 or the adaptable risk transfer function 73 as provided by the assembly module 5. However, in an embodied variant relative to the above, the loss corresponding to the risk that is transferred to the second resource pooling system 12, as defined by the corresponding variable risk transfer segments 721, 722, 723 of the top-down table 7, can, e.g., also be directly defined by the second resource pooling system 12 by transferring resources from the second resource pooling system 12 to the concerned risk exposure components 21,22, 23 by means of the second payment-transfer module 42.

Finally, in a further specified embodied variant, an independent verification risk event trigger of the system 1 can be activated in the event that the occurrence of indicators for one of the predefined risk events is triggered in the data flow pathway 213, 223, 233 of a risk exposure component 21,22, 23, etc. by means of the risk event trigger 31,32, and wherein the independent verification risk event trigger, additionally, is triggering with regard to the occurrence indicators for one of the predefined risk events in an alternative data flow pathway 215, 225, 235 with independent measuring parameters from the primary data flow pathway 213, 223, 233 in order to verify the occurrence of the risk event at the risk exposure component 21, 22, 23, etc. As a variant, the parametric or otherwise predefined transfer of payments is only assigned to the corresponding trigger-flag when the occurrence of the risk event at the risk exposure component 21, 22, 23, etc. has been verified by the independent verification risk event trigger.

LIST OF REFERENCE SIGNS

1 System for providing optimized risk protection of risk exposure components
10 First resource-pooling system/first insurance system
11 Switching device
   111 Capturing device
12 Second resource-pooling system/second insurance system
21, 22, 23, 24 Risk exposure component
   213, 223, 233 interface to data flow pathway
   215, 225, 235 Measuring devices
3 Core engine
   31, 32 Risk event triggers
41 First payment transfer module
42 Second payment transfer module
5 Assembly module
511 Segmentation layer of first risk contribution
512 Segmentation layer of second risk contribution
513 Segmentation layer of third risk contribution
51$i$ Segmentation layer of i-th risk contribution
   51 Calculation engine of the assembly module
61 First payment data store
62 Second payment data store
7 Top-down table with variable risk transfer segments
   711, 712, 713 Data structures for storing variable risk transfer segments
   721, 722, 723 Variable risk transfer segments
   731, 732, 733 Payment parameter assigned to each of the segments
   73 Adaptable risk transfer function
   74 Structure of risk transfer segments providing risk transfer function
8 Monitoring module
9 Data flow pathway of measuring devices
   91 Network

The invention claimed is:

1. A system comprising:
a first automated resource-pooling system including circuitry and linked with a first insurance system;
a second automated resource-pooling system including circuitry and linked with a second insurance system, the first and second insurance systems being coupled and autonomously operated;
a switching device including circuitry and configured to couple, control and operate the first resource-pooling system and the second resource-pooling system as technical devices; and
risk exposure components connected to the first resource-pooling system of the first insurance system by a first payment-transfer device configured to receive and store payments from the risk exposure components for pooling of risks, the risk exposure components being exposed to defined risk events having measurable stages of impact of a measurable loss size on the risk exposure components, wherein
the first resource-pooling system is connected to the second resource-pooling system of the second insurance system by a second payment-transfer device configured to receive and store payments from the resource-pooling system of the first insurance system to transfer risks corresponding to pooled risks of the risk exposure components from the first insurance system to the second insurance system,
the switching device includes a top-down table providing data structures to store a plurality of variable risk transfer segments in corresponding memories comprising an assigned segment value providing a measure for a segmented part of the pooled risk, wherein, via parts of the segmented risk layers of the pooled risk, an adaptable risk transfer function is provided by an assembly device, wherein the risk transfer function is segmented into plural layers with different shares, the risk transfer function using a non-proportional risk transfer structure, wherein the risk transfer function is generated by the assembly device by interpolating the assigned segment values as support points or interpolation points, and wherein the selection of the parameterization of the risk transfer function performed automatically from a predefined set of the risk transfer functions based on selection criteria in that, only if a risk transfer function is provided by the structure of risk transfer segments providing the risk transfer function via the assembly device, the risk exposure of the first insurance system corresponding to the variable risk transfer segments of the top-down table is transferred to the second insurance system via the risk transfer function, the selection of the risk-transfer functions to establish the parametrization comprise one risk-transfer function based on a proportional and one based on a non-proportional structure among the selectable risk-transfer functions providing the convergence of the optimization to a parametrization,
the switching device includes a core engine configured to assign a payment parameter to each variable risk transfer segment of the top-down table and accumulate over all variable risk transfer segments to a total payment sum,
the switching device includes a capturing device configured to capture payment transfer parameters from the first payment-transfer device to the second payment-transfer device, and upon triggering a transfer of the total payment sum at the second payment-transfer device, risk exposure of the first insurance system corresponding to the variable risk transfer segments is transferred to the second insurance system based on the adaptable risk transfer function provided by the assigned segment values,
the core engine includes event-driven triggers configured to trigger, in a data flow pathway, measuring devices corresponding to the risk exposure components for the occurrence of a risk event of the defined risk events and, in response to a triggering of an occurrence of a predefined risk event or stage of the impact of a predefined risk event in the data flow pathway, the core engine is configured to determine the corresponding variable risk segment within the top-down table based on the measured actual loss, and wherein the risk event triggers are dynamically adjusted based on time-correlated incidence data of one or a plurality of risk events, and upon each triggering of an occurrence of measuring parameters by the measuring devices indicating the risk event by at least one risk event trigger, a total parametric payment is allocated with the triggering, and the total allocated payment is transferrable when the occurrence has been triggered, and in response to the occurrence of a risk event, the switching device is configured to generate an activation signal based on the determined variable risk segment and the measured actual loss, and the switching device is further configured to trigger the complementary activation of the first and second resource-pooling system by the generated activation signal by transferring the activation to the first and/or second resource pooling system to provide risk protection to the risk exposure components, wherein the activation of the first and/or second resource pooling system is based on the adaptable risk transfer function, the assigned segment values providing threshold values for the complementary switching and activation, and wherein via the generated activation signal based on the determined variable risk segment within the top-down table, a corresponding trigger flag is activated by the first and/or the second resource-pooling system, and a parametric transfer of payment is assigned to the corresponding trigger flag and a loss associated with the occurrence of a risk event is distinctly covered based on the respective trigger flag, the selected parametrized risk transfer function being optimized by varying the sets of parameters and interpolating the assigned segment values as support points based on iterations in a batch process using an optimization process.

2. The system according to claim 1, wherein
the switching device is further configured to capture a transfer of payment assigned to one of the variable risk transfer segments from the first insurance system at the second payment-transfer device,
the assigned variable risk transfer segment is activated, and
the risk exposure of the first insurance system corresponding to the assigned variable risk transfer segment is transferred to the second insurance system.

3. The system according to claim 1, wherein
a loss corresponding to the risk event and allocated to a pooled risk exposure component is covered by the resource pooling system of the first insurance system by a transfer of payments from the first resource-pooling system to the risk exposure component, and
a second transfer of payment from the second resource pooling system to the first resource pooling system is triggered by the generated activation signal based on the determined variable risk transfer segment within the top-down table and the measured actual loss of the risk exposure component or the adaptable risk transfer function provided by the assembly device.

4. The system according to claim 3, wherein the loss corresponding to the risk that is transferred to the second resource pooling system, as defined by the corresponding variable risk transfer segments of the top-down table, is directly covered by the second resource pooling system by the transfer of resources from the second resource pooling system to the concerned risk exposure components by the second payment-transfer device.

5. The system according to claim 1, wherein
the risk transfer function comprises the plurality of stored, variable risk transfer segments, and
the first resource pooling system comprises an interface configure to access and adapt the assigned segment value of each of the variable risk transfer segments prior to the transfer of the payment sum from the first resource pooling system to the second resource pooling system.

6. The system according to claim 1, further comprising:
a receipt and preconditioned storage, wherein
the assembly device of the switching device is configured to process risk-related component data and provide a likelihood of the risk exposure for one or a plurality of the pooled risk exposure components based on risk-related component data, and
the receipt and preconditioned storage stores payments from risk exposure components for the pooling of the risks, the payments being dynamically determined based on total risk and/or the likelihood of the risk exposure of the pooled risk exposure components.

7. The system according to claim 1, further comprising:
a receipt and preconditioned storage, wherein
the assembly device of the switching device is configured to process risk-related component data and provide a likelihood of the risk exposure for one or a plurality of the pooled risk exposure components based on risk-related component data, and
the receipt and preconditioned storage stores payments from first resource pooling system to the second resource pooling system for the transfer of the risk, the payments being dynamically determined based on total risk and/or the likelihood of the risk exposure of the pooled risk exposure components.

8. The system according to claim 1, wherein the first resource-pooling system is further configured to dynamically adapt a number of pooled risk exposure components to a range where non-covariant, occurring risks covered by the resource-pooling system affect only a relatively small proportion of the total pooled risk exposure components at any given time.

9. The system according to claim 1, wherein the second resource-pooling system is further configured to dynamically adapt the pooled risk transfer from first resource pooling system to a range where non-covariant, occurring risks covered by the second resource-pooling system affect only a relatively small proportion of the total pooled risk transfer from the first resource pooling system at any given time.

10. The system according to claim 1, wherein
the data structure of the top-down table that stores the variable risk transfer segments comprises at least for each of the stored risk segments parameters indicating the size of the variable risk transfer segments and the payment parameters assigned to each variable risk transfer segment of the top-down table, and
the data structure comprises a parameter indicating the accumulated total payment sum.

11. The system according to claim 1, wherein the activation of the first and/or second resource pooling system is based on the adaptable risk transfer function directly providing threshold values for the complementary switching and activation of the first and/or second resource pooling system, respectively.

12. A system for adaptive operation of autonomously operated risk-transfer systems by providing self-sufficient risk protection of a variable number of risk exposure components by an automated resource-pooling system configured to pool resources and absorb transferred risks, the risk exposure components being connected to the resource-pooling system by a payment-transfer device configured to receive and store payments from the risk exposure components for the pooling of risks, and the risk exposure components being exposed to defined risk events having measurable stages of impact of a measurable loss size on the risk exposure components, the system comprising:

a switching device that includes circuitry and a top-down table providing data structures to store a plurality of variable risk transfer segments including an assigned segment value providing a measure for a segmented part of the pooled risk, wherein, via the parts of the segmented risk layers of the pooled risk, an adaptable risk transfer function being provided by an assembly device, wherein the risk transfer function is segmented into plural layers with different shares, the risk transfer function using a non-proportional risk transfer structure, wherein the risk transfer function is generated by the assembly device by interpolating the assigned segment values as support points or interpolation points, and wherein the selection of the parameterization of the risk transfer function perfoii ied automatically from a predefined set of the risk transfer functions based on selection criteria in that, only if a risk transfer function is provided by the structure of risk transfer segments providing the risk transfer function via the assembly device, the risk exposure of the first insurance system corresponding to the variable risk transfer segments of the top-down table is transferred to the second insurance system via the risk transfer function, the selection of the risk-transfer functions to establish the parametrization comprise one risk-transfer function based on a proportional and one based on a non-proportional structure among the selectable risk-transfer functions providing the convergence of the optimization to a parametrization, wherein the switching device includes a core engine configured to assign a payment parameter to each variable risk transfer segment of the top-down table and accumulate over all variable risk transfer segments to a total payment sum, the switching device including a capturing device configured to capture payment transfer parameters from the risk exposure components to the payment-transfer device, and, upon triggering a transfer of the total payment sum at the payment-transfer device, the risk exposure of the risk exposure component assigned to the transfer of the payment sum is transferred to the insurance system, the core engine includes event-driven triggers to trigger, in a data flow pathway, measuring devices corresponding to the risk exposure components for the occurrence of a risk event of the defined risk events, and, in response to a triggering of an occurrence of a predefined risk event or stage of the impact of a predefined risk event in the data flow pathway, the core engine is configured to determine the corresponding variable risk segment within the top-down table based on the measured actual loss, and wherein the risk event triggers are dynamically adjusted based on time-correlated incidence data of one or a plurality of risk events, and upon each triggering of an occurrence of measuring parameters by the measuring devices indicating the risk event by at least one risk event trigger, a total parametric payment is allocated with the triggering, and the total allocated payment is transferrable when the occurrence has been triggered, and in response to the occurrence of a risk event, the switching device is configured to generate an activation signal based on the determined variable risk segment and the measured actual loss, the switching device triggering the activation of the resource-pooling system by the generated activation signal by transferring the activation to the resource pooling system to provide risk protection to the risk exposure components, the activation of the resource pooling system being based on the adaptable risk transfer function, and wherein via the generated activation signal based on the determined variable risk segment within the top-down table, a corresponding trigger flag is activated by the resource-pooling system, and a parametric transfer of payment is assigned to the corresponding trigger flag and a loss associated with the occurrence of a risk event is distinctly covered based on the respective trigger flag, the selected parametrized risk transfer function being optimized by varying the sets of parameters and interpolating the assigned segment values as support points based on iterations in a batch process using an optimization process.

13. A method involving an event-triggered switching device for complementary switching of a first and a second coupled, autonomously operated insurance systems by providing self-sufficient risk protection of a variable number of risk exposure components by two automated resource-pooling systems linked with the insurance systems, wherein the risk exposure components are connected to the resource-pooling system of the first insurance system by a plurality of first payment-transfer devices configured to receive and store payments from the risk exposure components for the pooling of risks, the risk exposure components being exposed to defined risk events having measurable stages of impact of a measurable loss size on the risk exposure components, wherein the first resource-pooling system is connected to the second resource-pooling system of the second insurance system by a second payment-transfer device configured to receive and store payments from the resource-pooling system of the first insurance system for transferring risks corresponding to the pooled risks of the risk exposure components from the first insurance system to the second insurance system, the event-triggered switching device being configured to couple and control the automated resource-pooling systems the method comprising:

providing data structures to store in corresponding memories a plurality of variable risk transfer segments by a top-down table of the switching device comprising an assigned segment value giving an accounting for a segmented part of the pooled risk, an adaptable risk transfer function being generated by an assembly device via the parts of the segmented risk layers of the pooled risk, wherein the risk transfer function is segmented into plural layers with different shares, the risk transfer function using a non-proportional risk transfer structure, wherein the risk transfer function is generated by the assembly device by interpolating the assigned segment values as support points or interpolation points, and wherein the selection of the parameterization of the risk transfer function performed automatically from a predefined set of the risk transfer functions based on selection criteria in that, only if a risk transfer function is provided by the structure of risk transfer segments providing the risk transfer function via the assembly device, the risk exposure of the first insurance system corresponding to the variable risk transfer segments of the top-down table is transferred to the second insurance system via the risk transfer function, the selection of the risk-transfer functions to establish the parametrization comprise one risk-transfer function based on a proportional and one based on a non-proportional structure among the selectable risk-transfer functions providing the convergence of the optimization to a parametrization;

assigning a payment parameter to each variable risk transfer segment of the top-down table by a core engine of the switching device and accumulating the payment parameters to a total payment sum:

capturing, by a capturing device, payment transfer parameters from the first payment-transfer device to the second payment-transfer device;

when the total payment sum at the second payment-transfer device has been triggered, transferring the risk exposure of the first insurance system corresponding to the variable risk transfer segments of the top-down table to the second insurance system;

triggering the core engine by event-driven triggers in a data flow pathway of measuring devices of the risk exposure components for the occurrence of the defined risk events;

determining, in response to a triggering of an occurrence of a predefined risk event or stage of the impact of a predefined risk event in the data flow pathway, the corresponding variable risk segment within the top-down table by the core engine based on the measured actual loss;

dynamically adjusting the risk event triggers by an operating device based on time-correlated incidence data for one or a plurality of risk events;

allocating, upon each triggering of an occurrence of measuring parameters indicating a risk event by at least one risk event trigger, a total parametric payment with the triggering;

transferring the total allocated payment when the occurrence has been triggered;

generating an activation signal by the switching device based on the determined variable risk segment and the measured actual loss; and triggering, by the switching device, the complementary activation of the first and second resource-pooling systems by the generated activation signal by transferring the activation to the first and/or second resource pooling system, risk protection for the risk exposure components being provided based on the transferred activation signal by the first and/or second resource pooling system, wherein via the generated activation signal based on the determined variable risk segment within the top-down table, a corresponding trigger flag is activated by the first and/or second resource-pooling system, and a parametric transfer of payment is assigned to the corresponding trigger flag and a loss associated with the occurrence of a risk event is distinctly covered based on the respective trigger flag, the selected parametrized risk transfer function being optimized by varying the sets of parameters and interpolating the assigned segment values as support points based on iterations in a batch process using an optimization process.

14. The method according to claim 13, further comprising:

capturing, by the capturing device, a transfer of a payment assigned to one of the variable risk transfer segments from the first insurance system at the second payment-transfer device:

activating the assigned variable risk transfer segment; and transferring the risk exposure of the first insurance system corresponding to the assigned variable risk transfer segment to the second insurance system.

15. The method according to claim 13, further comprising only transferring the risk exposure of the first insurance system corresponding to corresponding to the variable risk transfer segments of the top-down table to the second insurance system when a risk transfer function is provided by the assembly device.

16. The method according to claim 15, wherein a loss corresponding to the risk event and allocated to a pooled risk exposure component is covered by the resource pooling system of the first insurance system by a transfer of payment from the first resource-pooling system to the risk exposure component, further comprising:

triggering a second transfer of payment from the second resource pooling system to the first resource pooling system by the generated activation signal based on the determined variable risk segment within the top-down table, and the measured actual loss of the risk exposure component or the adaptable risk transfer function provided by the assembly device.

17. The method according to claim 16, wherein the loss corresponding to the risk transferred to the second resource pooling system, as defined by the corresponding variable risk transfer segments of the top-down table, is directly covered by the second resource pooling system by the transfer of resources from the second resource pooling system to the concerned risk exposure components by the second payment transfer device.

18. The method according to claim 13, wherein the risk transfer function comprises the plurality of stored, variable risk transfer segments, further comprising accessing and adapting, by an interface of the first resource pooling system the assigned segment value of each of the variable risk transfer segments prior to the transfer of the payment sum from the first resource pooling system to the second resource pooling system.

19. The method according to claim 13, further comprising:

processing risk-related component data by the assembly device, and providing a likelihood of the risk exposure for one or a plurality of the pooled risk exposure components based on risk-related component data; and storing, in a receipt and preconditioned storage, payments from risk exposure components for the pooling of the risks, the payments being dynamically determined based on total risk and/or the likelihood of the risk exposure of the pooled risk exposure components.

20. The method according to claim 13, further comprising:

processing risk-related component data by the assembly device;

providing a likelihood of the risk exposure for one or a plurality of the pooled risk exposure components based on risk-related component data; and storing, in a receipt and preconditioned storage, payments from the first resource pooling system to the second resource pooling system for the transfer of the risk, the payments being dynamically determined based on total risk and/or the likelihood of the risk exposure of the pooled risk exposure components.

21. The method according to claim 13, further comprising dynamically adapting the number of pooled risk exposure components by the first resource-pooling system to a range where non-covariant, occurring risks covered by the resource-pooling system affect only a relatively small proportion of the total pooled risk exposure components at any given time.

22. The method according to claim 13, further comprising dynamically adapting, by the second resource pooling system, the number of pooled risk shares transferred from the first resource pooling system to a range where non-covariant, occurring risks covered by the second resource-pooling system affect only a relatively small proportion of the total pooled risk transfers from first resource pooling system at any given time.

23. The method according to claim 13, wherein the data structure of the top-down table to store the variable risk transfer segments comprises at least for each of the stored risk segments parameters indicating the size of the variable risk transfer segments and the payment parameters assigned to each variable risk transfer segment of the top-down table, and wherein the data structure comprises a parameter indicating the accumulated total payment sum.

\* \* \* \* \*